US012718154B2

(12) United States Patent
Osamura et al.

(10) Patent No.: US 12,718,154 B2
(45) Date of Patent: Aug. 25, 2026

(54) DATA PROCESSING DEVICE, DATA PROCESSING SYSTEM, AND DATA PROCESSING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Ryo Osamura, Kawasaki Kanagawa (JP); Naoyuki Narita, Funabashi Chiba (JP); Tomoyuki Maeda, Kawasaki Kanagawa (JP)

(73) Assignees: KABUSHIKI KAISHA TOSHIBA, Kawasaki (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 771 days.

(21) Appl. No.: 18/166,781

(22) Filed: Feb. 9, 2023

(65) Prior Publication Data

US 2024/0070553 A1 Feb. 29, 2024

(30) Foreign Application Priority Data

Aug. 30, 2022 (JP) ................................ 2022-136527

(51) Int. Cl.
*G06N 20/20* (2019.01)
*G06F 17/16* (2006.01)

(52) U.S. Cl.
CPC ............. *G06N 20/20* (2019.01); *G06F 17/16* (2013.01)

(58) Field of Classification Search
CPC .......... G06N 20/20; G06N 3/08; G06N 20/00; G06F 17/16; G06F 17/18
See application file for complete search history.

(56) References Cited

U.S. PATENT DOCUMENTS 11,983,152 B1 * 5/2024 Basu ...................... G06Q 10/04
2007/0043518 A1 * 2/2007 Nicholson ............. G16B 20/20 702/23

(Continued)

FOREIGN PATENT DOCUMENTS

CN 109299161 A 2/2019
JP 2016-191966 A 11/2016

(Continued)

OTHER PUBLICATIONS

Shin Y, Chae CB, Kim S. Multivariate Multiple Regression Models for a Big Data-Empowered SON Framework in Mobile Wireless Networks. Mobile Information Systems. 2016;2016(1):3489193. (Year: 2016).*

(Continued)

*Primary Examiner* — Oluwatosin Alabi
(74) *Attorney, Agent, or Firm* — Finnegan, Henderson, Farabow, Garrett & Dunner, LLP

(57) ABSTRACT

According to one embodiment, a data processing device includes an acquisitor, and a processor. The acquisitor is configured to acquire a first acquired data and a first other data. The processor is configured to perform a first evaluation index derivation operation deriving a first evaluation index from a plurality of first regression labels and a plurality of first synthetic regression labels. The first regression labels are derived from a plurality of first machine learning models. The first machine learning models are derived from a plurality of first sample data. The first synthetic regression labels are derived from a plurality of first synthetic machine learning models. The first synthetic machine learning models are derived from the first sample data and the first acquire data by a first transfer leaning. The first sample data are derived from the first other data or a first conversion other data.

20 Claims, 15 Drawing Sheets

(56) References Cited

U.S. PATENT DOCUMENTS

2017/0132528 A1* 5/2017 Aslan .................... G06N 20/00
2020/0042893 A1* 2/2020 Hunt ........................ G06N 5/01
2020/0082013 A1* 3/2020 Triplet .................. G06N 5/022
2021/0157707 A1 5/2021 Komatsuda et al.
2021/0248293 A1* 8/2021 Yokota ................ G06N 3/0495
2021/0357776 A1 11/2021 Quader et al.

FOREIGN PATENT DOCUMENTS

JP 2016-191975 A 11/2016
JP 2021-86241 A 6/2021

OTHER PUBLICATIONS

Hal Daumè III, "Frustratingly Easy Domain Adaptation," Proc. of the 45th Annual Meeting of the Assoc. of Computational Linguistics, pp. 256-263 (2007).
Japan Patent Office, Office Action in JP Application No. 2022-136527, (Dec. 2, 2025).
Kevin Duh et al., "Flexible Sample Selection Strategies for Transfer Learning in Ranking," Preprint submitted to Info. Proc. and Mgmt., pp. 1-29 (2011).
SIPO, First Office Action in CN App. No. 202310114225.9 (Apr. 29, 2026).

* cited by examiner

DATA PROCESSING DEVICE, DATA PROCESSING SYSTEM, AND DATA PROCESSING METHOD

CROSS-REFERENCE TO RELATED APPLICATIONS

This application is based upon and claims the benefit of priority from Japanese Patent Application No. 2022-136527, filed on Aug. 30, 2022; the entire contents of which are incorporated herein by reference.

FIELD

Embodiments described herein relate generally to a data processing device, a data processing system, and a data processing method.

BACKGROUND

For example, data relating to various electronic devices such as magnetic recording/reproducing devices are processed. For example, machine learning is performed by data processing. Highly accurate data processing is desired.

DETAILED DESCRIPTION

Figure 1:
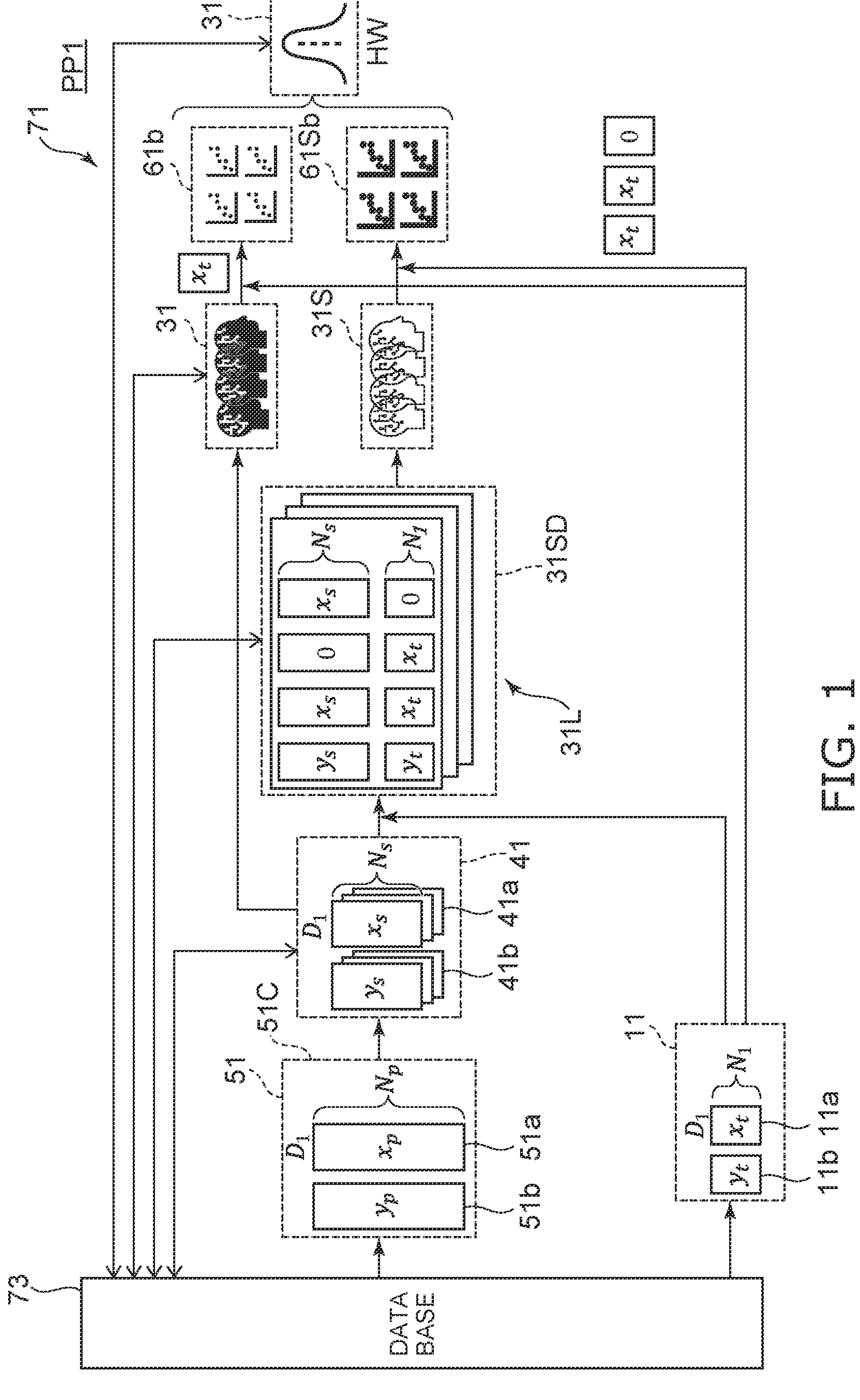
FIG. 1 is a schematic view illustrating the operation of a data processing device according to a first embodiment.

According to one embodiment, a data processing device includes an acquisitor, and a processor. The acquisitor is configured to acquire a first acquired data and a first other data. The processor is configured to perform a first evaluation index derivation operation deriving a first evaluation index from a plurality of first regression labels and a plurality of first synthetic regression labels. The first regression labels are derived from a plurality of first machine learning models. The first machine learning models are derived from a plurality of first sample data. The first synthetic regression labels are derived from a plurality of first synthetic machine learning models. The first synthetic machine learning models are derived from the first sample data and the first acquire data by a first transfer leaning. The first sample data are derived from the first other data or a first conversion other data obtained by converting the first other data.

Various embodiments are described below with reference to the accompanying drawings.

The drawings are schematic and conceptual. In the specification and drawings, components similar to those described previously or illustrated in an antecedent drawing are marked with like reference numerals, and a detailed description is omitted as appropriate.

First Embodiment

FIG. 1 is a schematic view illustrating the operation of a data processing device according to a first embodiment.

Figure 2:
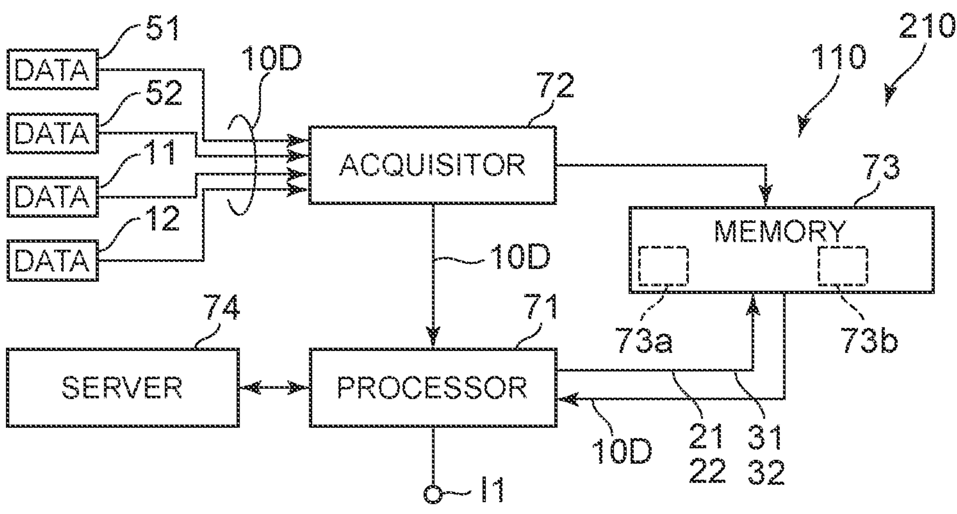
FIG. 2 is a schematic view illustrating the data processing device according to the first embodiment.

FIG. 2 is a schematic view illustrating the data processing device according to the first embodiment.

As shown in FIG. 1, the data processing device 110 according to the embodiment includes a processor 71. The processor 71 can acquire various data 10D. For example, data processing device 110 may include an acquisitor 72. The acquisitor 72 may acquire various data 10D and the data 10D acquired by the acquisitor 72 may be supplied to the processor 71. The data processing device 110 may include a memory 73. The data 10D acquired by the acquisitor 72 may be stored in the memory 73. The processor 71 may acquire the data 10D stored in the memory 73 from the memory 73.

The acquisitor 72 is, for example, an interface. The acquisitor 72 may be, for example, an interface for input and output. The processor 71 may output information I1 on the processed result. The information I1 may be output via the acquisitor 72 (interface). The processor 71 may be able to communicate with a server 74. The communication may include at least one of providing information or obtaining information. The communication may be based on any method, wired or wireless.

The data 10D may include, for example, acquired data (e.g., first acquired data 11 and second acquired data 12, etc.). The data 10D may include other data (e.g., first other data 51 and second other data 52, etc.).

As will be described later, the processor 71 can generate various data (eg, first generated data 21, second generated data, first machine learning model 31, second machine learning model 32, etc.). The generated various data may be stored in the memory 73.

For example, the memory 73 may include a first memory area 73$a$ and a second memory area 73$b$. For example, the first acquired data 11 and the first other data 51 may be stored in the first memory area 73$a$. The processor 71 may acquire the first acquired data 11 and the first other data 51 from the first memory area 73$a$. For example, the second acquired data 12 and the second other data 52 may be stored in the second memory area 73*b*. The processor 71 may acquire the second acquired data 12 and the second other data 52 from the second memory area 73*b*.

FIG. 1 illustrates the first evaluation index derivation operation PP1 performed by the processor 71. In the first evaluation index derivation operation PP1, the processor 71 derives a first evaluation index 31P from multiple first regression labels 61*b* and multiple first synthetic regression labels 61Sb.

The multiple first regression labels 61*b* are derived from the multiple first machine learning models 31. The multiple first machine learning models 31 are derived from multiple first sample data 41. The multiple first synthetic regression labels 61Sb are derived from multiple first synthetic machine learning models 31S. The multiple first synthetic machine learning models 31S are derived from the multiple first sample data 41 and the first acquired data 11 by first transfer learning 31L. The multiple first sample data 41 are derived from the first other data 51 or first conversion other data 51C obtained by converting the first other data 51. An example of deriving (converting) the first conversion other data 51C will be described later.

An example of derivation of the first evaluation index 31P will be described below. As already described, the acquisitor 72 can acquire the first acquired data 11 and the first other data 51. These data are supplied to the processor 71.

In one example, the first acquired data 11 is small-scale data relating to the target device. The first other data 51 is large-scale data relating to at least one of the target device or a device similar to the target device. For example, the first acquired data 11 relates to evaluation data for small-scale experiments. For example, the first other data 51 relates to evaluation data relating to mass-produced products.

In one example, the target device is a magnetic recording/reproducing device. The first acquired data 11 relates to data relating to a prototype of the magnetic recording/reproducing device. The first other data 51 relates to data relating to mass-produced magnetic recording/reproducing devices.

The first acquired data 11 is, for example, target data. The first other data 51 is, for example, source data. For example, source data includes a sufficient amount of information (e.g., a large amount of information). For example, target data does not include a sufficient amount of information. The target data includes, for example, a small amount of information. In the transfer learning, knowledge gained from the source data with sufficient amount of information is applied to generate regression models that work with high accuracy on the target data with insufficient amount of information.

The first acquired data 11 includes, for example, a first feature value matrix 11*a* with N1 rows and D1 columns and a first acquired label 11*b* with N1 rows. The first other data 51 includes a first other feature value matrix 51*a* with Np rows and D1 columns and a first other label 51*b* with Np rows. "N1" is an integer of 2 or more. "Np" is an integer of 2 or more. "D1" is an integer of 1 or more. "N1" is smaller than "Np".

One of the multiple first sample data 41 includes a first sample feature value matrix 41*a* with Ns rows and D1 columns and a first sample label 41*b* with Ns rows. "Ns" is an integer of 2 or more. "Ns" is smaller than "Np".

For example, a part of the first other data 51 is extracted to obtain one of the multiple first sample data 41. For example, 1000 pieces of data are extracted from 8000 pieces of first other data 51 to become one of the multiple first sample data 41. For example, 1000 pieces of data are extracted from 8000 pieces of first other data 51 to become another one of the multiple first sample data 41. The number of the multiple first sample data 41 is two hundred. A part of another one of the multiple first sample data 41 may be the same as a part of one of the multiple first sample data 41.

Derivation (i.e., extraction) of the multiple first sample data 41 may be performed, for example, by bootstrap sampling. The processor 71 can derive the multiple first sample data 41 by bootstrap sampling from the first other data 51 or the first conversion other data 51C.

The processor 71 derives the multiple first synthetic machine learning models 31S from the multiple first sample data 41 and the first acquired data 11 by the first transfer learning 31L. In one example, for example, multiple first synthetic data 31SD may be used in the first transfer learning 31L. The first transfer learning 31L may include any transfer learning. An example of the first transfer learning 31L will be described later.

The processor 71 derives the multiple first synthetic regression labels 61Sb from the multiple first synthetic machine learning models 31S.

On the other hand, the processor 71 derives the multiple first machine learning models 31 from multiple first sample data 41. The processor 71 derives the multiple first regression labels 61*b* from the multiple first machine learning models 31.

The processor 71 derives the first evaluation index 31P from the multiple first regression labels 61*b* and the multiple first synthetic regression labels 61Sb derived as described above.

The first evaluation index 31P corresponds to a difference between the multiple first regression labels 61*b* and the multiple first synthetic regression labels 61Sb.

As described above, in the embodiment, from the first acquired data 11 (small scale data) and the first other data 51 (large scale data), the multiple first regression labels 61*b* and the multiple first synthetic regression label 61Sb are derived. The first evaluation index 31P is derived based on the multiple first regression labels 61*b* and the multiple first synthetic regression labels 61Sb. The first evaluation index 31P corresponds to the "certainty" of the derived multiple first synthetic regression labels 61Sb.

For example, the synthetic regression label for the first acquired data 11 (small-scale data) is derived by transfer learning based on the first other data 51 (large-scale data). At this time, for example, when the characteristics of the first other data 51 (large-scale data) match the characteristics of the first acquired data 11 to a high degree, the value (for example, the difference) of the first evaluation index 31P is small. For example, when the characteristics of the first other data 51 (large-scale data) are less likely to match the characteristics of the first acquired data 11, the value (for example, the difference) of the first evaluation index 31P is large.

In the embodiment, the "certainty" of synthetic regression labels derived by transfer learning is known. Highly accurate data processing is possible due to highly accurate "certainty". According to the embodiment, it is possible to provide a data processing device capable of highly accurate data processing.

In the embodiment, for example, the multiple first sample data 41 are derived from the first other data 51 (large-scale data). By using the multiple first sample data 41, the multiple first regression labels 61*b* and the multiple first synthetic regression labels 61Sb can be derived. Variation occurs in the difference between these values. The first evaluation index 31P is used as an evaluation index corresponding to the variation in the difference. The "certainty" can be known.

Figure 3A:
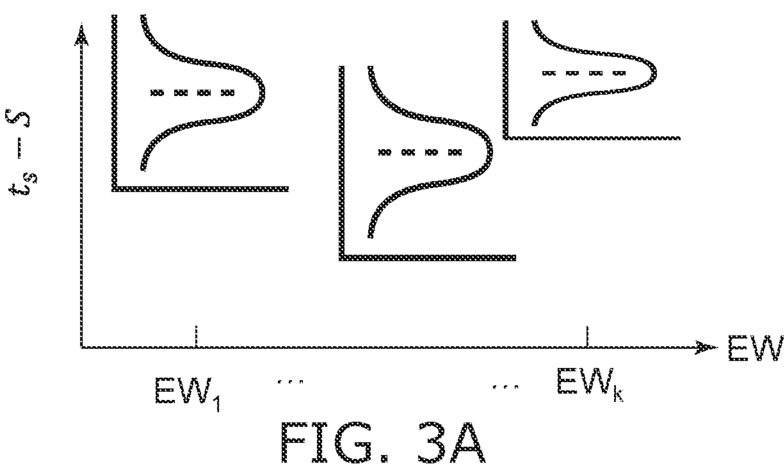
FIGS. 3A to 3C are schematic views illustrating the operation of data processing device according to the first embodiment.
Figure 3B:
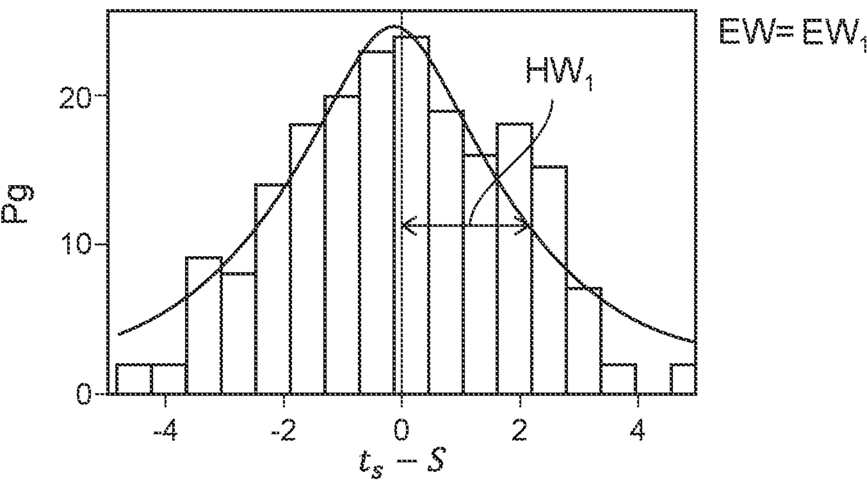
Figure 3C:
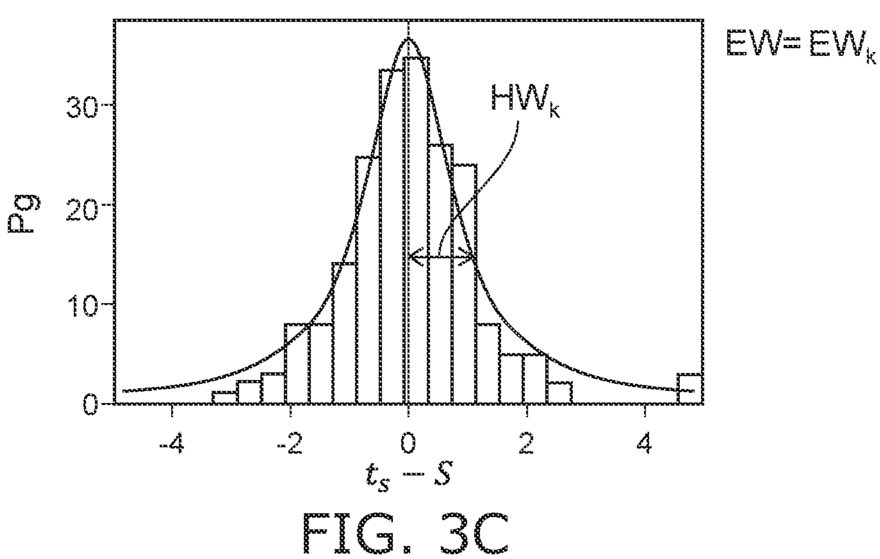

FIGS. 3A to 3C are schematic views illustrating the operation of data processing device according to the first embodiment.

FIGS. 3A to 3C correspond to the case where the target device is a magnetic recording/reproducing device. In the following, an erase width in the magnetic recording/reproducing device is used as an example of the value corresponding to the first feature value matrix 11$a$. The values corresponding to the first feature value matrix 11$a$ may be other values relating to the magnetic recording/reproducing device. In the following, the data of the value (for example, erase width) corresponding to the first feature value matrix 11$a$ will be described by simplifying the model.

The horizontal axis of FIG. 3A is the erase width EW. The erase width EW corresponds to, for example, the first feature value matrix 11$a$. One of the plurality of first regression labels 61$b$ is defined as "S". One of the multiple first synthetic regression labels 61Sb is defined as "ts". The vertical axis of FIG. 3A is a difference ($t_s$–S) between one of the multiple first regression labels 61$b$ and the multiple first synthetic regression labels 61Sb.

The erase width EW can vary between widths $EW_1$ to $EW_k$. "k" is an integer of 1 or more. FIG. 3B corresponds to the characteristics when the erase width EW is the width $EW_1$. FIG. 3C corresponds to the characteristics when the erase width EW is the width $EW_k$. The horizontal axis in FIGS. 3B and 3C is the difference ($t_s$–S). The vertical axis in FIGS. 3B and 3C is the frequency Pg. FIGS. 3B and 3C correspond to histograms of the difference ($t_s$–S). FIGS. 3B and 3C correspond to the distribution of the difference ($t_s$–S). FIGS. 3A to 3C schematically show data in the data processing device 110. For example, the shapes of histograms (distributions) illustrated in FIGS. 3B and 3C are examples, and may differ from histograms in actual data.

As shown in FIGS. 3B and 3C, the histogram (distribution) of the difference ($t_s$–S) changes according to the erase width EW. As shown in FIGS. 3B and 3C, in the histogram (distribution), the half-value width (for example, the half-value half-width) is defined as an index HW. The first evaluation index 31P may be, for example, the average of the indices HW.

The "i"th index HW is defined as "$HW_i$". "HW", which is the first evaluation index 31P, is represented by the following first formula.

$$HW = \frac{1}{n}\sum_{i=1}^{n} HW_i \tag{1}$$

In the first formula, "n" is the number of types of erase width EW. As shown in the first formula, the first evaluation index 31P corresponds to the average of the half-width (index HW) of the histogram of the difference ($t_s$–S) between one of the multiple first regression labels 61$b$ and one of the multiple first synthetic regression labels 61Sb. Thus, the first evaluation index 31P corresponds to the average of the distribution of differences between one of the multiple first regression labels 61$b$ and one of the multiple first synthetic regression labels 61Sb.

For example, when the index HW is small, the "certainty" is high. When the index HW is small, the "certainty" is low. By using such a first evaluation index 31P, the "certainty" of the derived multiple first synthetic regression labels 61Sb can be known.

An example of the first transfer learning 31L will be described below. An example of the first transfer learning 31L based on one of the multiple first sample data 41 will be described below.

Figure 4:
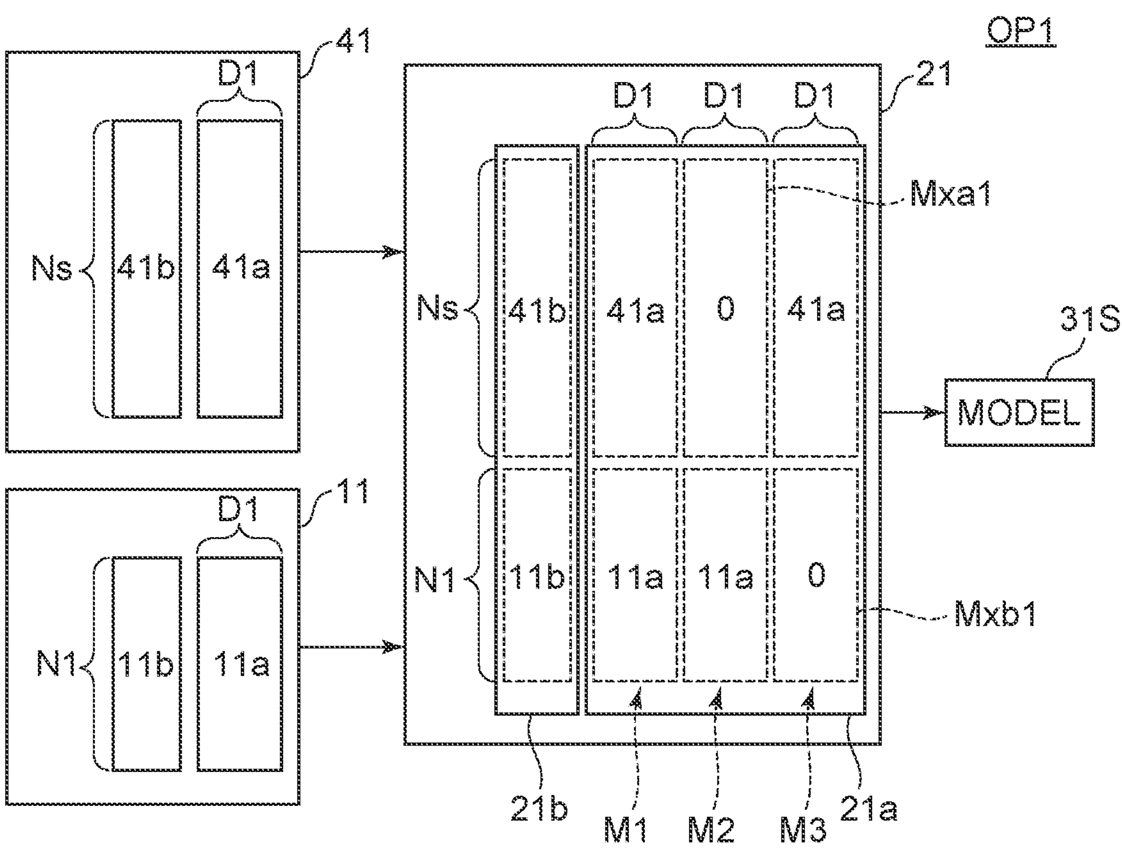
FIG. 4 is a schematic view illustrating the operation of the data processing device according to the first embodiment.

FIG. 4 is a schematic view illustrating the operation of the data processing device according to the first embodiment.

As shown in FIG. 4, as already described, one of the multiple first sample data 41 includes a first sample feature value matrix 41$a$ with Ns rows and D1 columns and a first sample label 41$b$ with Ns rows.

In the first operation OP1, the processor 71 can generate one of the multiple first synthetic machine learning models 31S based on the first acquired data 11 and the first generated data 21 based on one of the multiple first sample data 41. The first generated data 21 is, for example, one example of the multiple first synthesized data 31SD (see FIG. 1).

As shown in FIG. 4, the first generated data 21 includes a first generated matrix 21$a$ and first generated labels 21$b$. The first generated matrix 21$a$ is a matrix with (Ns+N1) rows and (3×D1) columns. The first generated label 21$b$ is the data with (Ns+N1) row. The number of columns of the first generated label 21$b$ is 1, for example.

As shown in FIG. 4, the first generated matrix 21$a$ includes first matrix data M1, second matrix data M2 and third matrix data M3.

The components of the first matrix data M1 include combinations in the row direction of the first sample feature value matrix 41$a$ and the first feature value matrix 11$a$.

The components of the second matrix data M2 include combination in the row direction of a matrix Mxa1 (that is, 0 matrix) of 0 components with Ns rows and D1 columns and the first feature value matrix 11$a$.

The components of the third matrix data M3 include combinations in the row direction of the first sample feature value matrix 41$a$ and a matrix Mxb1 of 0 components with N1 rows and D1 columns (that is, 0 matrix).

The components of the first generated label 21$b$ include the combination in the row direction of the first sample label 41$b$ and the first acquired label 11$b$.

For example, (Ns+N1)/D1 may be 250 or more. (Ns+N1)/D1 is defined as a first ratio R1. The first ratio R1 may be 500 or more.

In the embodiment, such first generated data 21 is generated. The first synthetic machine learning model 31S is generated based on the first generated data 21. Highly accurate data processing becomes possible in the first synthetic machine learning model 31S.

Thus, in the embodiment, transfer learning is performed. In the transfer learning according to the embodiment, for example, the first generated data 21 is derived by combining the first acquired data 11 (target data) with one of the multiple first sample data 41. A machine learning model based on such first generated data 21 is used. This provides higher accuracy than the first reference example in which a machine learning model based only on target data is used.

Figure 5:
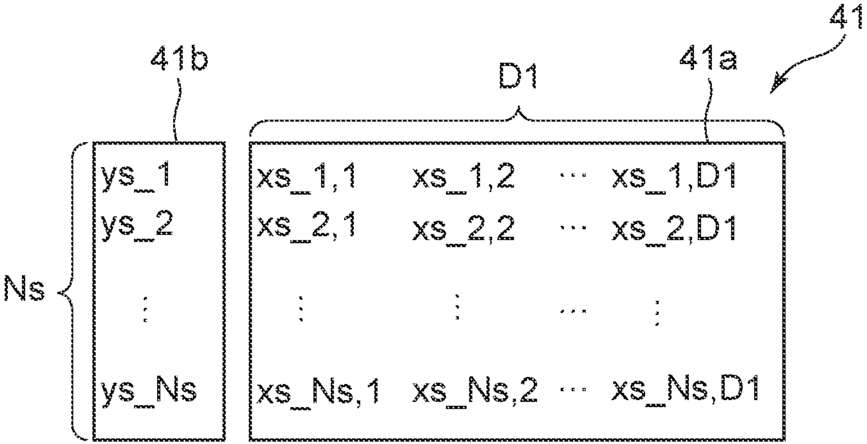
FIG. 5 is a schematic view illustrating the operation of the data processing device according to the first embodiment.
Figure 6:
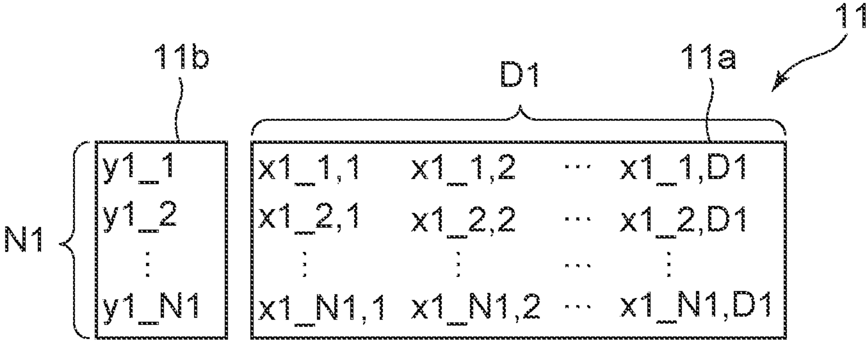
FIG. 6 is a schematic view illustrating the operation of the data processing device according to the first embodiment.
Figure 7:
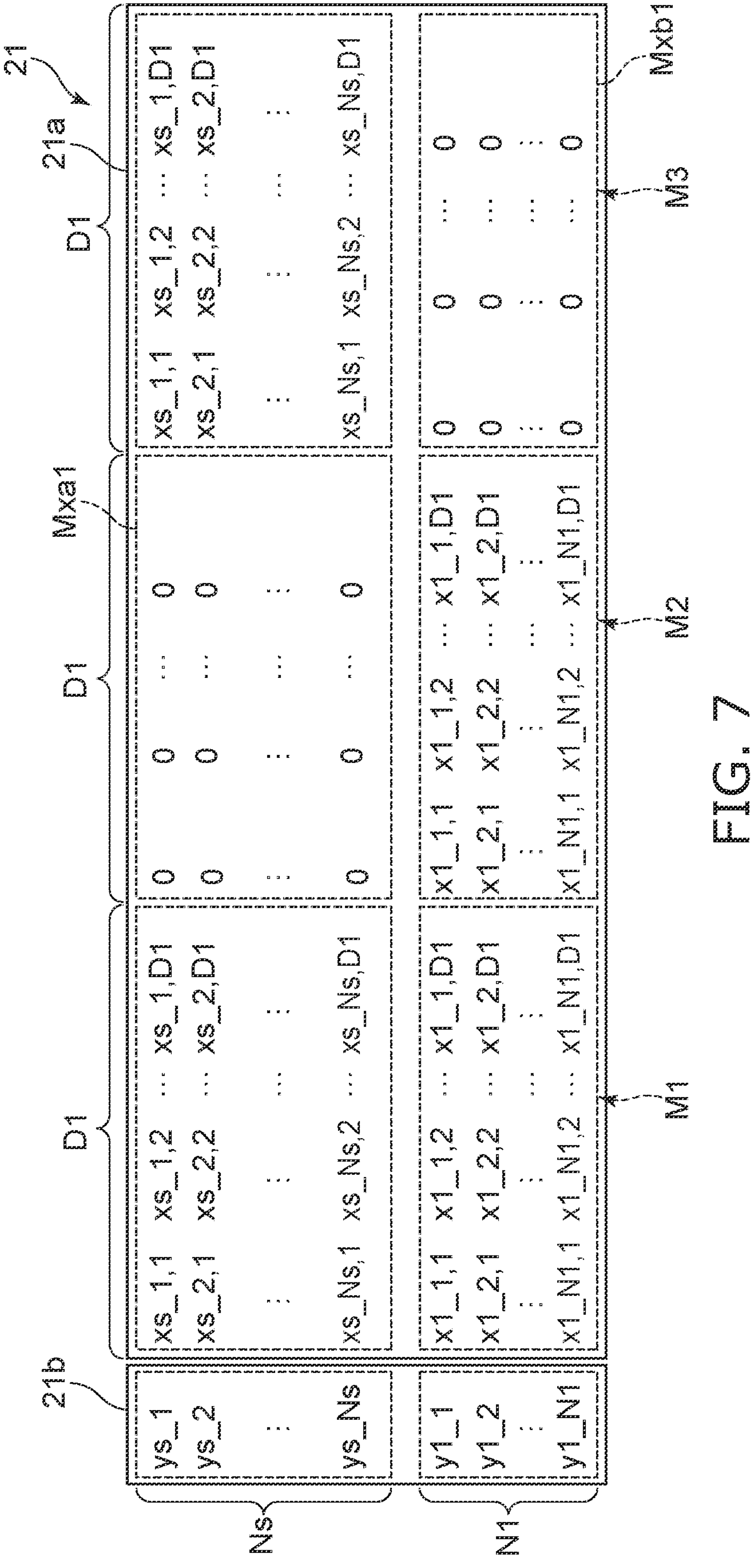
FIG. 7 is a schematic view illustrating the operation of the data processing device according to the first embodiment.

FIGS. 5 to 7 are schematic views illustrating the operation of the data processing device according to the first embodiment.

FIG. 5 illustrates one of the multiple first sample data 41. FIG. 6 illustrates the first acquired data 11. FIG. 7 illustrates the first generated data 21.

As shown in FIG. 5, one of the multiple first sample data 41 includes first sample labels 41$b$ with Ns rows. The first sample label 41$b$ includes, for example, ys_1; ys_2; . . .

ys_Ns. One of the multiple first sample data 41 includes the first sample feature value matrix 41*a* with Ns rows and D1 columns. The first row of the first sample feature value matrix 41*a* includes, for example, xs_1,1; xs_1,2; . . . xs_1,D1. The second row of the first sample feature value matrix 41*a* includes, for example, xs_2,1; xs_2,2; . . . xs_2,D1. The Ns-th row of the first sample feature value matrix 41*a* includes, for example, xs_Ns,1; xs_Ns,2; . . . xp_Ns,D1.

As shown in FIG. 6, the first acquired data 11 includes the first acquired labels 11*b* with N1 rows. The first acquired label 11*b* includes, for example, y1_1; y1_2; . . . y1_N1. The first acquired data 11 includes the first feature value matrix 11*a* with N1 rows and D1 columns. The first row of the first feature value matrix 11*a* includes, for example, x1_1,1; x1_1,2; . . . x1_1,D1. The second row of the first feature value matrix 11*a* includes, for example, x1_2,1; x1_2,2; . . . x1_2,D1. The N1-th row of the first feature value matrix 11*a* includes, for example, x1_N1,1; x1_N1,2; . . . x1_N1,D1.

As shown in FIG. 7, the first generated data 21 includes the first generated labels 21*b* with (Ns+N1) rows. The first generated label 21*b* includes, for example, ys_1; ys_2; . . . ys_Ns; y1_1; y1_2; . . . y1_N1.

The first generated data 21 includes the first generated matrix 21*a* with (Ns+N1) rows and (3×D1) columns.

The first row of the first generated matrix 21*a* includes, for example, xs_1,1; xs_1,2; . . . xs_1,D1; D1 "0"s; xs_1,1; xs_1,2; . . . xs_1,D1. The second row of the first generated matrix 21*a* includes, for example, xs_2,1; xs_2,2; . . . xs_2,D1; D1 "0"s; xs_2,1; xs_2,2; . . . xs_2,D1. The Ns-th row of the first generated matrix 21*a* includes, for example, xs_Ns,1; xs_Ns,2; . . . xs_Ns,D1; D1 "0"s; xs_Ns,1; xs_Ns,2; . . . xs_Ns,D1.

The (Ns+1)-th row of the first generated matrix 21*a* includes, for example, x1_1,1; x1_1,2; . . . x1_1,D1; x1_1,1; x1_1,2; . . . x1_1,D1; D1 "0"s. The (Ns+2)-th row of the first generated matrix 21*a* includes, for example, x1_2,1; x1_2,2; . . . x1_2,D1; x1_2,1; x1_2,2; . . . x1_2,D1; D1 "0"s. The (Ns+N1)-th row of the first generated matrix 21*a* includes, for example, x1_N1,1; x1_N1,2; . . . x1_N1,D1; x1_N1,1; x1_N1,2; . . . x1_N1, D1; D1 "0"s.

The first synthetic machine learning model 31S is generated based on such first generated data 21. For example, the processor 71 generates the first synthetic machine learning model 31S from at least one selected from the group consisting of kernel regression, linear regression, Ridge regression, Lasso regression, Elastic Net, gradient boosting regression, random forest regression, k-nearest neighbor regression, and logistic regression.

Kernel regression may include at least one of Gaussian process regression or SVR (Support Vector Regression), for example.

The processor 71 may be able to further perform the following processing in the first operation OP1.

Figure 8:
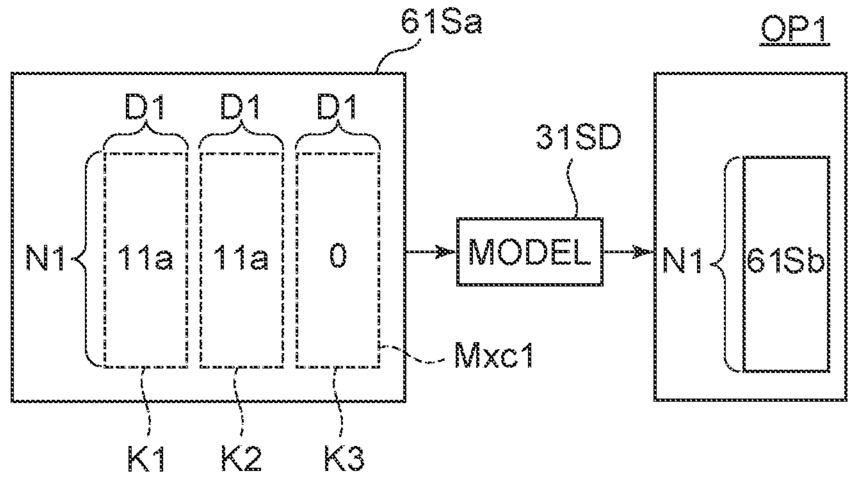
FIG. 8 is a schematic view illustrating the operation of the data processing device according to the first embodiment.

FIG. 8 is a schematic view illustrating the operation of the data processing device according to the first embodiment.

As shown in FIG. 8, the processor 71 can further derive the first synthetic regression label 61Sb by inputting a first synthetic regression matrix 61Sa to the first synthetic machine learning model 31S in the first operation OP1.

The first synthetic regression matrix 61Sa has N1 rows and (3×D1) columns. The first synthetic regression matrix 61Sa includes first synthetic regression matrix data K1, second synthetic regression matrix data K2 and third synthetic regression matrix data K3. The components of the first synthetic regression matrix data K1 include the first feature value matrix 11*a*. The components of the second regression matrix data K2 include the first feature value matrix 11*a*. The components of the third synthetic regression matrix data K3 include a matrix Mxc1 (that is, 0 matrix) of 0 components with N1 rows and D1 columns. The derived first synthetic regression label 61Sb derived has N1 rows.

High accuracy is obtained in the first synthetic regression label 61Sb thus obtained. For example, in the first reference example described above, the machine learning model based on the first acquired data 11 (target data) is used. In the first reference example, the accuracy of regression labels obtained using this machine learning model is low. In the embodiment, the first synthetic regression label 61Sb with higher accuracy than the first reference example is obtained.

Figure 9:
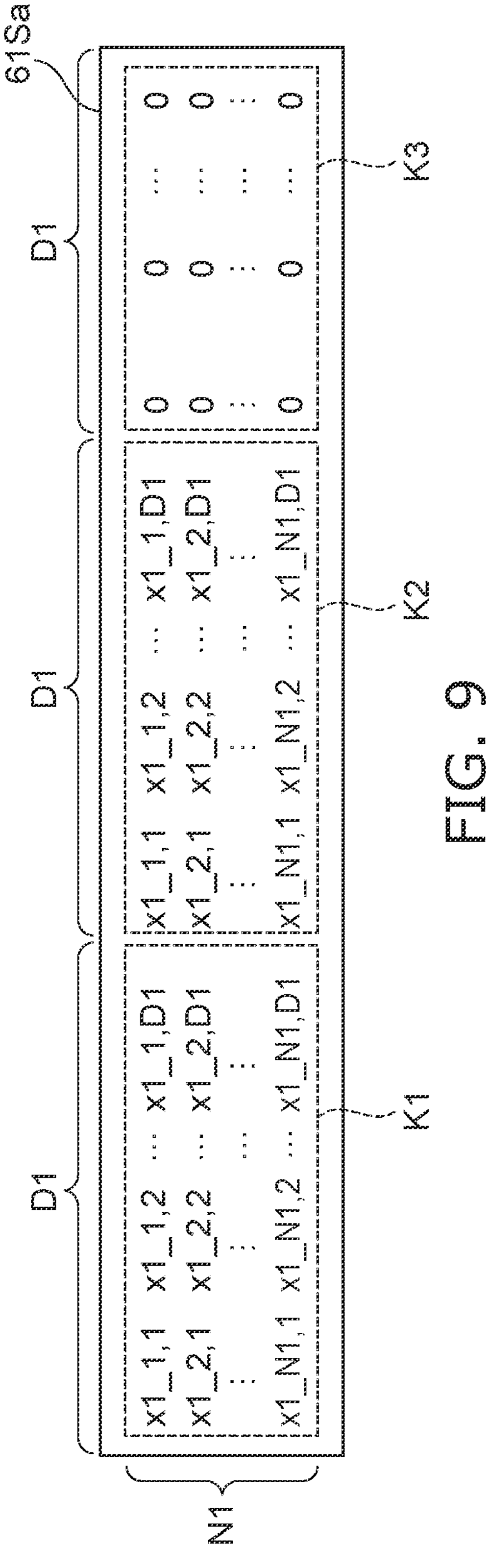
FIG. 9 is a schematic view illustrating the operation of the data processing device according to the first embodiment.

FIG. 9 is a schematic view illustrating the operation of the data processing device according to the first embodiment.

FIG. 9 illustrates the first synthetic regression matrix 61Sa. The first row of the first synthetic regression matrix 61Sa includes, for example, x1_1,1; x1_1,2; . . . x1_1,D1; x1_1,1; x1_1,2; . . . x1_1,D1; D1 "0"s. The second row of the first synthetic regression matrix 61Sa includes, for example, x1_2,1; x1_2,2: . . . x1_2,D1; x1_2,1; x1_2,D1; D1 "0"s. The N1-th row of the first synthetic regression matrix 61Sa includes, for example, x1_N1,1; x1_N1,2; . . . x1_N1, D1; x1_N1,1; x1_N1,2 . . . x1_N1,D1; D1 "0"s. Such a first synthetic regression matrix 61Sa is input to the first synthetic machine learning model 31S to obtain the first synthetic regression label 61Sb.

Figure 10:
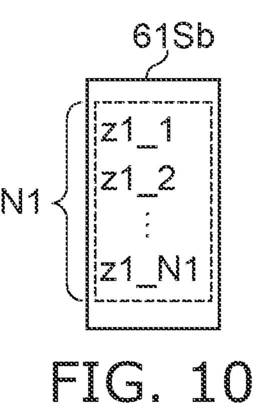
FIG. 10 is a schematic view illustrating the operation of the data processing device according to the first embodiment.

FIG. 10 is a schematic view illustrating the operation of the data processing device according to the first embodiment.

FIG. 10 illustrates the first synthetic regression label 61Sb. As shown in FIG. 10, the first synthetic regression label 61Sb includes, for example, z1_1; z1_2; . . . z1_N1. Such a first synthetic regression label 61Sb has high accuracy.

For another one of the multiple first sample data 41, the operations described with respect to FIGS. 4 to 10 may be performed. As a result, the multiple first synthetic regression labels 61Sb are derived.

In the embodiment, the processor 71 may be able to further derive an error index based on the first evaluation index 31P. The error index corresponds to an estimated value of the error for the "more certain trend" when the first acquired data 11 (small-scale data) can be acquired as large-scale data.

The memory 73 may be able to store at least one of the first acquired data 11, the first other data 51, or the first evaluation index 31P.

The memory 73 may be able to store at least one of the multiple first regression labels 61*b*, the multiple first synthetic regression labels 61Sb, the multiple first machine learning models 31, the multiple first sample data 41, the multiple first synthetic machine learning models 31S, or a first conversion other data 51C.

An example of the first conversion other data 51C will be described below.

Figure 11A:
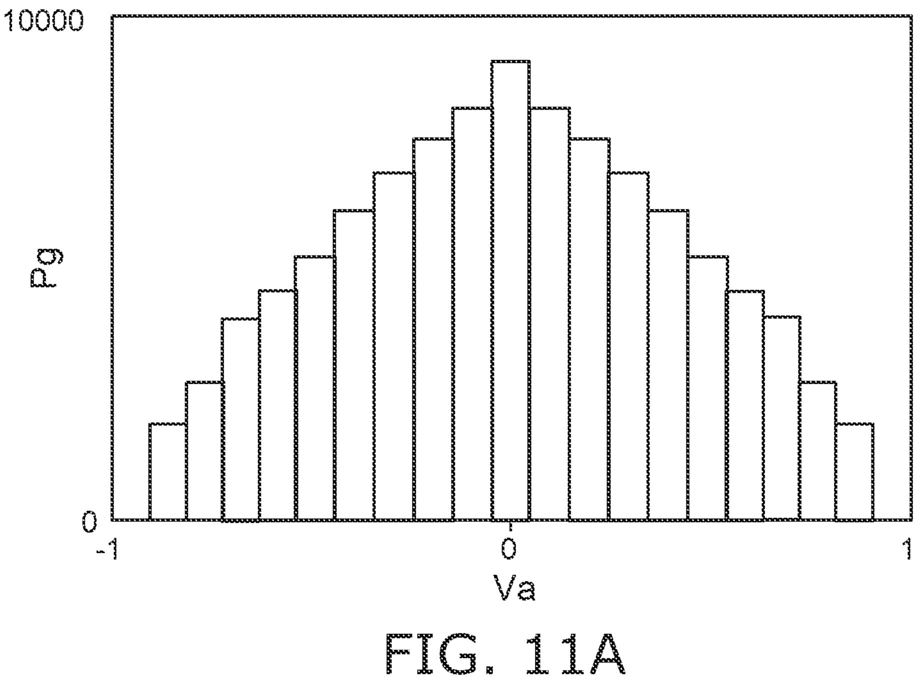
FIGS. 11A and 11B are schematic views illustrating the operation of the data processing device according to the first embodiment.
Figure 11B:
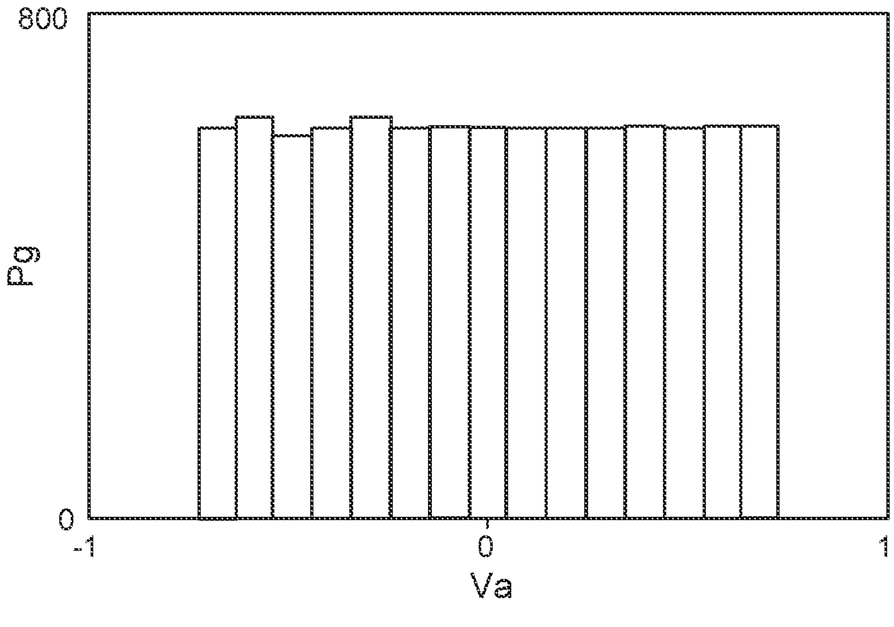

FIGS. 11A and 11B are schematic views illustrating the operation of the data processing device according to the first embodiment.

These diagrams correspond to a case where the target device is a magnetic recording/reproducing device. FIG. 11A corresponds to the first other data 51. FIG. 11B corresponds to the first conversion other data 51C. The horizontal axis of these figures is a value Va corresponding to the first feature value matrix 11*a*. The value Va may be the erase width EW. The vertical axis of these figures is the frequency Pg.

As shown in FIG. 11A, in the first other data 51, the distribution of the value Va is curved. By converting such first other data 51, the first conversion other data shown in FIG. 11B is obtained. In the first conversion other data 51C, the frequency Pg is uniformed within the range of the target value Va. For example, in the first other data 51 illustrated in FIG. 11A, a part of the data relating to the value Va with the high frequency Pg is discarded.

For example, the change in the frequency Pg of the first conversion other data 51C with respect to the first feature value matrix 11*a* is smaller than the change in the frequency Pg of the first acquired data 11 with respect to the first feature value matrix 11*a*. By using the first conversion other data 51C converted in this way, for example, the multiple first synthetic machine learning models 31S with higher accuracy can be obtained.

As described above, in the first evaluation index derivation operation PP1, the processor 71 derives the first evaluation index 31P from the first other data 51 and the first acquired data 11. In the embodiment, the processor 71 may perform the second evaluation index derivation operation PP2 described below.

Figure 12:
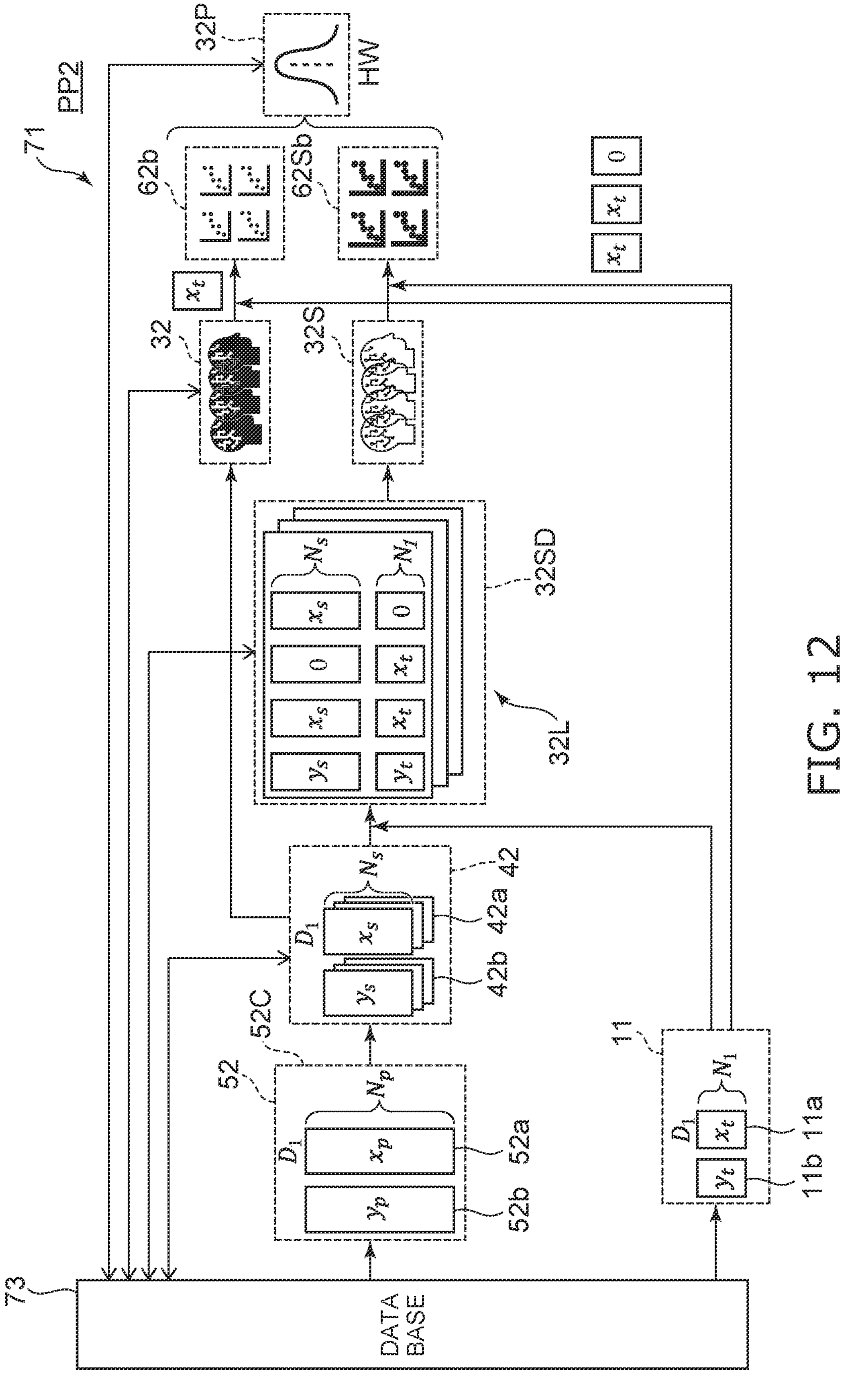
FIG. 12 is a schematic view illustrating the operation of the data processing device according to the first embodiment.

FIG. 12 is a schematic view illustrating the operation of the data processing device according to the first embodiment.

As shown in FIG. 12, the acquisitor 72 can further acquire the second other data 52. For example, the acquisitor 72 may acquire the second other data 52 as described with reference to FIG. 2. The second other data 52 acquired by the acquisitor 72 is supplied to the processor 71.

As shown in FIG. 12, in the second evaluation index derivation operation PP2, the processor 71 derives a second evaluation index 32P from the multiple second regression labels 62*b* and the multiple second synthetic regression labels 62Sb.

The multiple second regression labels 62*b* are derived from the multiple second machine learning models 32. The multiple second machine learning models 32 are derived from multiple second sample data 42. The multiple second synthetic regression labels 62Sb are derived from the multiple second synthetic machine learning models 32S. The multiple second synthetic machine learning models 32S are derived from the multiple second sample data 42 and the first acquired data 11 by a second transfer learning 32L. In one example, for example, multiple second synthetic data 32SD may be used in the second transfer learning 32L. The multiple second sample data 42 are derived from the second other data 52 or a second conversion other data 52C obtained by converting the second other data 52.

In the second evaluation index derivation operation PP2, processing similar to that of the first evaluation index derivation operation PP1 may be performed. The second evaluation index 32P is derived from the second other data 52 different from the first other data 51.

The processor 71 may be able to perform the designation operation of designating one of the first other data 51 and the second other data 52 based on the result of comparing the first evaluation index 31P and the second evaluation index 32P.

For example, when the first evaluation index 31P is smaller than the second evaluation index 32P, the first other data 51 is more suitable for the first acquired data 11 of target. In this case, the regression data obtained using the first other data 51 may be preferentially used.

For example, when the second evaluation index 32P is smaller than the first evaluation index 31P, the second other data 52 is more suitable for the first acquired data 11 of target. In this case, the regression data obtained using the second other data 52 may be preferentially used.

In the embodiment, the processor 71 may be able to perform regression on another acquired data using the designated one of the first other data 51 and the second other data 52. The regression data of another acquired data is obtained with higher accuracy.

Figure 13:
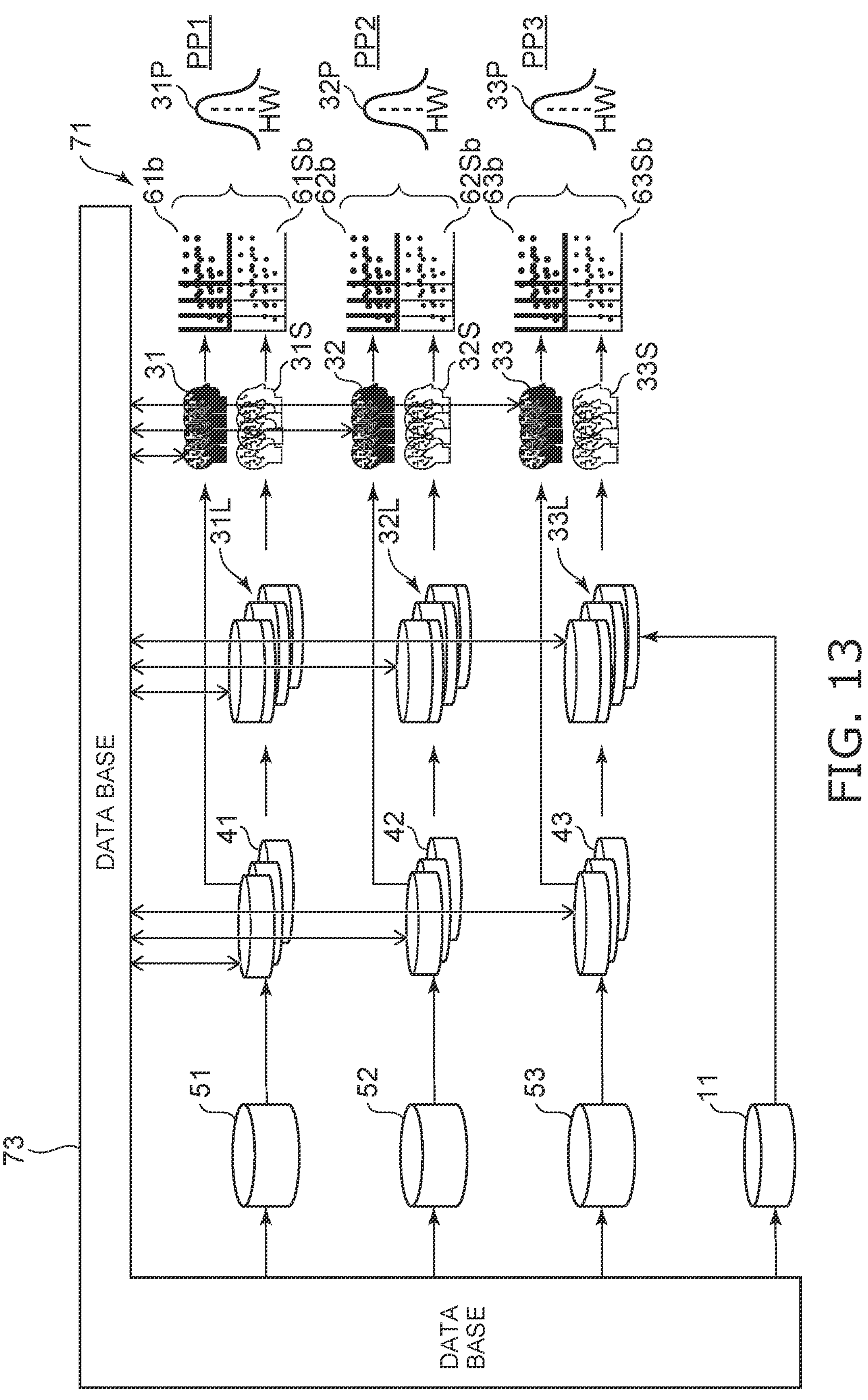
FIG. 13 is a schematic view illustrating the operation of the data processing device according to the first embodiment.

FIG. 13 is a schematic view illustrating the operation of the data processing device according to the first embodiment.

As shown in FIG. 13, the processor 71 may be able to perform the third evaluation index derivation operation PP3. In the third evaluation index derivation operation PP3, the processor 71 derives a third evaluation index 33P from multiple third regression labels 63*b* and multiple third synthetic regression labels 63Sb.

The multiple third regression labels 63*b* are derived from multiple third machine learning models 33. The multiple third machine learning models 33 are derived from multiple third sample data 43. The multiple third synthetic regression labels 63Sb are derived from multiple third synthetic machine learning models 33S. The multiple third synthetic machine learning models 33S are derived from the multiple third sample data 43 and the first acquired data 11 by the third transfer learning 33L. In one example, for example, multiple third synthetic data 33SD may be used in the third transfer learning 33L. The multiple third sample data 43 are derived from third other data 53 or third conversion other data 53C obtained by converting the third other data 53.

For example, one of the first other data 51, the second other data 52, and the third other data 53 may be designated based on the result of comparing the first evaluation index 31P, the second evaluation index 32P, and the third evaluation index 33P. These evaluation indices can be used to determine the best source data.

Figure 14:
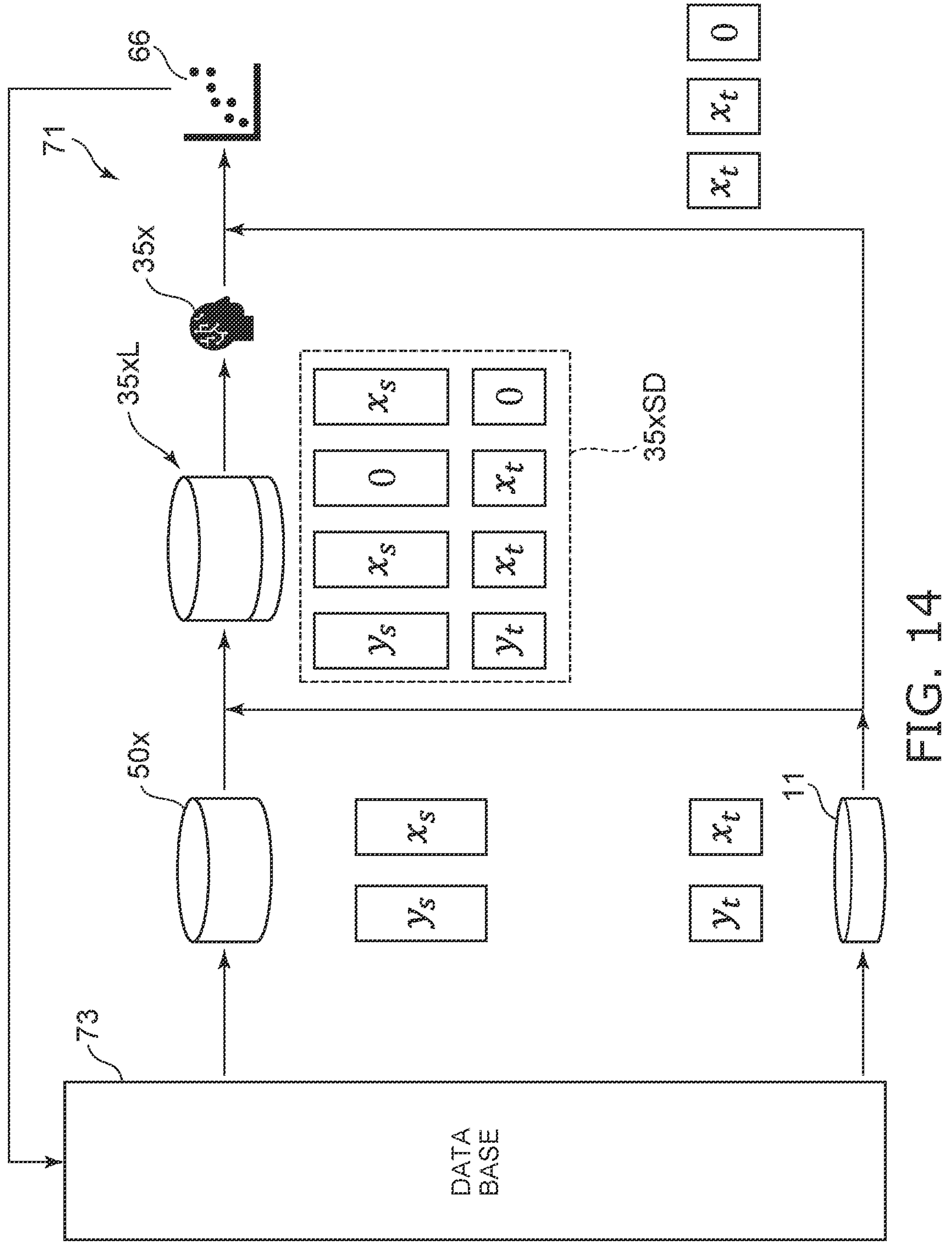
FIG. 14 is a schematic view illustrating the operation of the data processing device according to the first embodiment.

FIG. 14 is a schematic view illustrating the operation of the data processing device according to the first embodiment.

As shown in FIG. 14, the processor 71 can perform regression based on designated other data 50*x*. The designated other data 50*x* is designated based on the first evaluation index 31P, the second evaluation index 32P, and the like. The processor 71 can perform regression on the first acquired data 11 using the designated one of the first other data 51 and the second other data 52.

For example, a machine learning model 35*x* is derived by transfer learning 35*x*L based on the designated other data 50*x*. Synthetic data 35*x*SD may be used in the transfer learning 35*x*L. The synthetic data 35*x*SD is synthetic data in the corresponding machine learning model 35*x*. The machine learning model 35*x* performs regression on first acquired data 11 to obtain a regression label 66. The designated other data 50*x* is suitable for regression. The regression label 66 may be stored in the memory 73.

Figure 15:
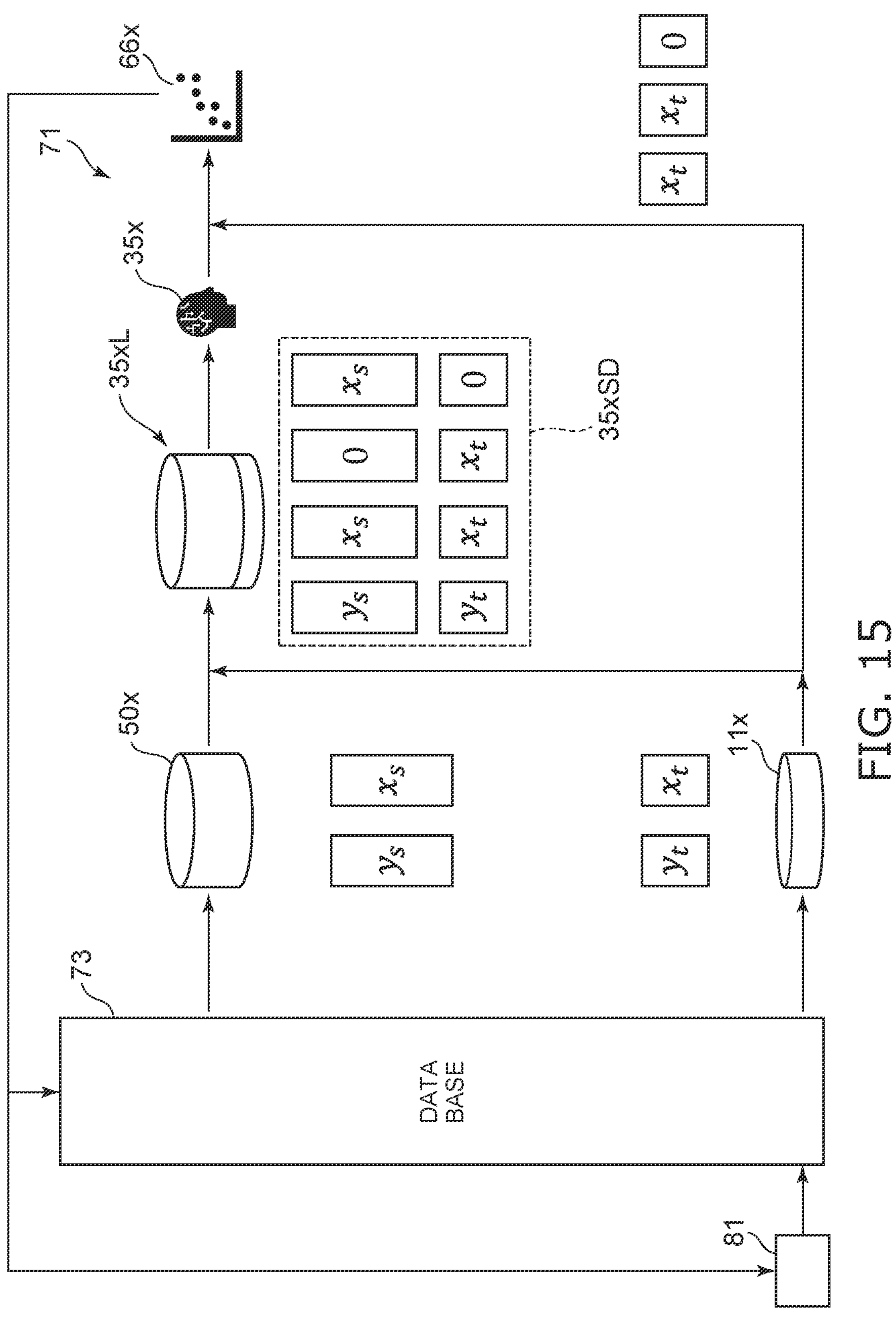
FIG. 15 is a schematic view illustrating the operation of the data processing device according to the first embodiment.

FIG. 15 is a schematic view illustrating the operation of the data processing device according to the first embodiment.

As shown in FIG. 15, there may be another acquired data 11*x* that is relatively similar to the first acquired data 11. In the embodiment, it may be possible to perform regression on another acquired data 11*x* using the designated one of the first other data 51 and the second other data 52. The machine learning model 35*x* performs regression on the other acquired data 11*x* to obtain a regression label 66*x*. The designated other data 50x is suitable for regression. The regression label 66x obtained in this way is suitable for the other acquired data 11x with high accuracy. The regression label 66x may be stored in the memory 73.

In the embodiment, the other acquired data 11x may be obtained from a first device 81. The processor 71 may be able to supply the result (regression label 66x) obtained by performing regression on the other acquired data 11x to the first device 81. Supply may be performed, for example, via a server 74 or the like.

For example, if the target device is a magnetic recording/reproducing device, the first device 81 may be the magnetic recording/reproducing device used by the user. Data obtained from the first device 81 (other acquired data 11x) are subjected to regression processing. The result (regression label 66x) obtained by regression processing is supplied to the first device 81. The regression label 66x may include, for example, operating conditions of first device 81. The regression label 66x may be a shift (e.g., abnormal) in the operating conditions of the first device 81. The characteristics of the first device 81 can be predicted with high accuracy.

For example, when developing a target device, regression accuracy may be low if the number of samples is small. In the embodiment, even when the number of samples is small, the characteristics of development items can be evaluated with high accuracy.

In the embodiment, the first acquired data 11, the first other data 51, the second other data 52, etc. may include characteristics of the magnetic recording/reproducing device.

The characteristics of the magnetic recording/reproducing device include, for example, at least one selected from the group consisting of SNR (Signal-Noise Ratio), BER (Bit Error Rate), Fringe BER, EWAC (Erase Width at AC erase), MWW (Magnetic Write track Width), OW (Over Write), SOVA-BER (Soft Viterbi Algorithm-BER), VMM (Viterbi Metric Margi), PRO (Repeatable RunOut), and NRRO (Non-Repeatable RunOut).

In the embodiment, "D1" may be one. For example, a high first ratio R1 is obtained. High-precision processing can be performed with a smaller "D1".

In the data processing system 210 (see FIG. 1) according to the embodiment, multiple elements (for example, the processor 71 and the memory 73) may be provided at different locations. Information may be transmitted and received by any communication method. For example, multiple parts included in the processor 71 may be provided at different locations.

For example, the data processing system 210 may include one or multiple acquisitors 72 and one or multiple processors 71 (see FIG. 2). The one or multiple acquisitors 72 can acquire the first acquired data 11 and the first other data 51.

As shown in FIG. 1, the one or multiple processors 71 can perform the first evaluation index derivation operation PP1. In the first evaluation index derivation operation PP1, the processor 71 derives the first evaluation index 31P from the multiple first regression labels 61b and the multiple first synthetic regression labels 61Sb. As already described, the multiple first regression labels 61b are derived from the multiple first machine learning models 31. The multiple first machine learning models 31 are derived from the multiple first sample data 41.

The multiple first synthetic regression labels 61Sb are derived from the multiple first synthetic machine learning models 31S. The multiple first synthetic machine learning models 31S are derived from the multiple first sample data 41 and the first acquired data 11 by the first transfer learning 31L. The multiple first sample data 41 are derived from the first other data 51 or the first conversion other data 51C obtained by converting the first other data 51.

According to the data processing system 210, according to the embodiment, a data processing system capable of highly accurate data processing is provided.

Figure 16:
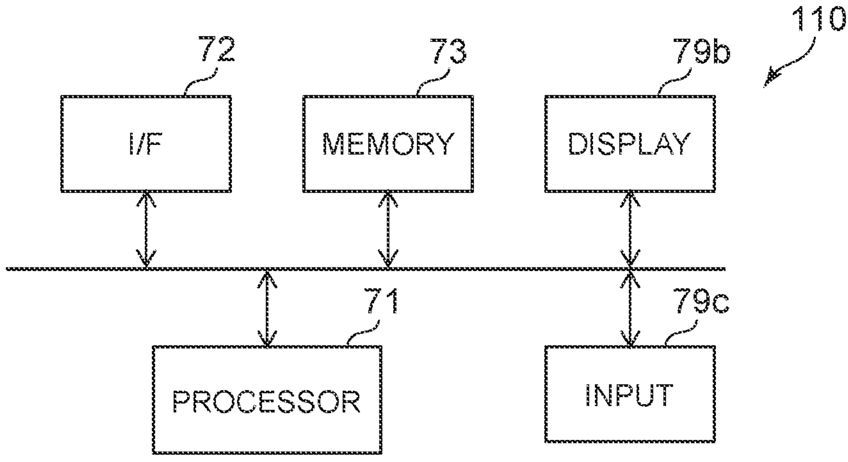
FIG. 16 is a schematic view illustrating the data processing device according to the first embodiment.

FIG. 16 is a schematic view illustrating the data processing device according to the embodiment.

As shown in FIG. 16, the data processing device 110 includes the processor 71, the acquisitor 72 and the memory 73. The processor 71 is, for example, an electric circuit. The memory 73 may include, for example, at least one of ROM (Read Only Memory) or RAM (Random Access Memory). Any storage device may be used as the memory 73.

The data processing device 110 may include a display 79b and an input 79c. The display 79b may include various displays. The input 79c includes, for example, a device having an operation function (e.g., keyboard, mouse, touch input panel, voice recognition input device, etc.).

The embodiment may include a program. The program causes a computer (processor 71) to perform the above operations. The embodiment may include a storage medium storing the above program.

Second Embodiment

The second embodiment relates to a data processing method.

The data processing method according to the embodiment causes the processor 71 to perform the first evaluation index derivation operation PP1. In the first evaluation index derivation operation PP1, the processor 71 derives the first evaluation index 31P from the multiple first regression labels 61b and the multiple first synthetic regression labels 61Sb. The multiple first regression labels 61b are derived from the multiple first machine learning models 31. The multiple first machine learning models 31 are derived from the multiple first sample data 41.

The multiple first synthetic regression labels 61Sb are derived from the multiple first synthetic machine learning models 31S. The multiple first synthetic machine learning models 31S are derived from the multiple first sample data 41 and the first acquired data 11 by the first transfer learning 31L. The multiple first sample data 41 are derived from the first other data 51 or the first conversion other data 51C obtained by converting the first other data 51. According to the embodiment, it is possible to provide a data processing method capable of highly accurate data processing.

The embodiments may include the following configurations (e.g., technical proposals).

Configuration 1

A data processing device, comprising:

an acquisitor; and a processor, the acquisitor being configured to acquire a first acquired data and a first other data, the processor being configured to perform a first evaluation index derivation operation deriving a first evaluation index from a plurality of first regression labels and a plurality of first synthetic regression labels, the plurality of first regression labels being derived from a plurality of first machine learning models, the plurality of first machine learning models being derived from a plurality of first sample data, the plurality of first synthetic regression labels being derived from a plurality of first synthetic machine learning models, the plurality of first synthetic machine learning models being derived from the plurality of first sample data and the first acquire data by a first transfer leaning, and the plurality of first sample data being derived from the first other data, or a first conversion other data obtained by converting the first other data.

Configuration 2

The data processing device according to Configuration 1, wherein the processor is configured to derive the plurality of first sample data from the first other data or the first conversion other data by bootstrap sampling.

Configuration 3

The data processing device according to Configuration 1 or 2, wherein the first acquired data includes a first feature value matrix with N1 rows and D1 columns, and a first acquired label with N1 rows, the first other data includes a first other feature value matrix with Np rows and D1 columns, and a first other label with Np rows, the N1 is an integer of 2 or more, the Np is an integer of 2 or more, the D1 is an integer of 1 or more, and the N1 is smaller than the Np Configuration 4

The data processing device according to Configuration 3, wherein one of the plurality of first sample data includes a first sample feature value matrix with Ns rows and D1 columns, and a first sample label with Ns rows, the Ns is an integer of 2 or more, and the Ns is smaller than the Np.

Configuration 5

The data processing device according to Configuration 4, wherein a change of frequency of the first conversion other data with respect to the first feature value matrix is smaller than a change of frequency of the first acquired data with respect to the first feature value matrix.

Configuration 6

The data processing device according to Configuration 4 or 5, wherein the processor is configured to perform a first synthetic machine learning model derivation operation deriving the plurality of first synthetic machine leaning models, in the first synthetic machine learning model derivation operation, the processor is configured to generate one of the plurality of first synthetic machine learning models based on a first generated data based on the first acquired data and one of the plurality of first sample data, the first generated data includes a first generated matrix with (Ns+N1) rows and (3×D1) columns and a first generated label with (Ns+N1) rows, the first generated matrix includes first matrix data, second matrix data, and third matrix data, components of the first matrix data include combination in a row direction of the first feature value matrix and the first sample feature value matrix, components of the second matrix data include combination in the row direction of a matrix of 0 components with Ns rows and D1 columns, and the first sample feature value matrix, components of the third matrix data include combination in the row direction of the first sample feature value matrix and a matrix of 0 components with N1 rows and D1 columns, and components of the first generated label include combination in the row direction of the first sample label and the first acquired label.

Configuration 7

The data processing device according to Configuration 6, wherein (Ns+N1)/D1 is 250 or more.

Configuration 8

The data processing device according to Configuration 6 or 7, wherein the processor, in the first synthetic machine learning model derivation operation, is configured to derive one of the plurality of first synthetic regression labels by inputting one of the plurality of first synthetic regression matrix into one of the plurality of first synthetic machine learning models, the one of the plurality of first synthetic regression matrix is with N1 rows and (3×D1) columns, the one of the plurality of first synthetic regression matrix includes first synthetic regression matrix data and second synthetic regression matrix data, and third synthetic regression matrix data, components of the first synthetic regression matrix data include the first feature value matrix, components of the second synthetic regression matrix data include the first feature value matrix, and components of the third synthetic regression matrix data include a matrix of 0 components with N1 rows and D1 columns.

Configuration 9

The data processing device according to any one of Configurations 3 to 8, wherein the first evaluation index corresponds to an average of a distribution of differences between one of the plurality of first regression labels and one of the plurality of first synthetic regression labels.

Configuration 10

The data processing device according to any one of Configurations 3 to 8, wherein the first evaluation index corresponds to an average of a distribution of a half-width of a histogram of differences between one of the plurality of first regression labels and one of the plurality of first synthetic regression labels.

Configuration 11

The data processing device according to any one of Configurations 1 to 10, wherein the processor is configured to further derive an error index based on the first evaluation index.

Configuration 12

The data processing device according to any one of Configurations 1 to 11, further comprising:

a memory, the memory being configured to store at least one of the first acquired data, the first other data or the first evaluation index.

Configuration 13

The data processing device according to Configuration 12, wherein the memory is configured to store at least one of the plurality of first regression labels, the plurality of first synthetic regression labels, the plurality of first machine learning models, the plurality of first sample data, the plurality of first synthetic machine learning models or the first conversion other data.

Configuration 14

The data processing device according to any one of Configurations 1 to 13, wherein the acquisitor is configured to further acquire a second other data, the processor is configured to perform a second evaluation index derivation operation deriving a second evaluation index from a plurality of second regression labels and a plurality of second synthetic regression labels, the plurality of second regression labels are derived from a plurality of second machine learning models, the plurality of second machine learning models are derived from a plurality of second sample data, the plurality of second synthetic regression labels are derived from a plurality of second synthetic machine learning models, the plurality of second synthetic machine learning models are derived from the plurality of second sample data and the first acquired data by a second transfer learning, and the plurality of second sample data are derived from the second other data, or a second conversion other data obtained by converting the second other data.

Configuration 15

The data processing device according to Configuration 14, wherein the processor is configured to perform a designation operation designating one of the first other data or the second other data based on a result comparing the first evaluation index and the second evaluation index.

Configuration 16

The data processing device according to Configuration 15, wherein the processor is configured to perform regression on another acquired data using the designated one of the first other data and the second other data.

Configuration 17

The data processing device according to Configuration 16, wherein the other acquired data is obtained from a first device, and the processor is configured to supply a result obtained by performing the regression on the other acquired data to the first device.

Configuration 18

A data processing system, comprising:

one or a plurality of acquisitors; and one or a plurality of processors, the one or the plurality of acquisitors being configured to acquire a first acquired data and a first other data, the one or the plurality of processors being configured to perform a first evaluation index derivation operation deriving a first evaluation index from a plurality of first regression labels and a plurality of first synthetic regression labels, the plurality of first regression labels being derived from a plurality of first machine learning models, the plurality of first machine learning models being derived from a plurality of first sample data, the plurality of first synthetic regression labels being derived from a plurality of first synthetic machine learning models, the plurality of first synthetic machine learning models being derived from the plurality of first sample data and the first acquired data by a first transfer learning, and the plurality of first sample data being derived from the first other data, or a first conversion other data obtained by converting the first other data.

Configuration 19

A data processing method causing a processor to perform a first evaluation index derivation operation, in the first evaluation index derivation operation, the processor deriving a first evaluation index from a plurality of first regression labels and a plurality of first synthetic regression labels, the plurality of first regression labels being derived from a plurality of first machine learning models, the plurality of first machine learning models being derived from a plurality of first sample data, the plurality of first synthetic regression labels being derived from a plurality of first synthetic machine learning models, the plurality of first synthetic machine learning models being derived from the plurality of first sample data and a first acquired data by a first transfer learning, and the plurality of first sample data being derived from a first other data, or a first conversion other data obtained by converting the first other data.

According to the embodiment, a data processing device, a data processing system, and a data processing method in which data processing is possible to be made with high accuracy.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in data processing devices, a data processing system, and a data processing method such as processors, acquisitors, memories, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all data processing devices, data processing systems, and data processing methods practicable by an appropriate design modification by one skilled in the art based on the data processing devices, the data processing systems, and the data processing methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A data processing device, comprising:

an acquisitor, the acquisitor being configured to acquire a first acquired data and a first other data; and a processor, the processor being configured to perform a first evaluation index derivation operation deriving a first evaluation index from a plurality of first regression labels and a plurality of first synthetic regression labels, the plurality of first regression labels being derived from a plurality of first machine learning models, the plurality of first machine learning models being derived from a plurality of first sample data, the plurality of first synthetic regression labels being derived from a plurality of first synthetic machine learning models, the plurality of first synthetic machine learning models being derived from the plurality of first sample data and the first acquire data by a first transfer learning, and the plurality of first sample data being derived from the first other data, or a first conversion other data obtained by converting the first other data, wherein the processor is configured to perform a first synthetic machine learning model derivation operation deriving the plurality of first synthetic machine learning models, in the first synthetic machine learning model derivation operation, the processor is configured to generate one of the plurality of first synthetic machine learning models based on a first generated data based on the first acquired data and one of the plurality of first sample data, the first generated data includes a first generated matrix with (Ns+N1) rows and (3×D1) columns and a first generated label with (Ns+N1) rows, where the Ns is an integer of 2 or more, the N1 is an integer of 2 or more, the D1 is an integer of 1 or more, the first generated matrix includes first matrix data, second matrix data, and third matrix data, components of the first matrix data include combination in a row direction of the first feature value matrix and the first sample feature value matrix, components of the second matrix data include combination in the row direction of a matrix of 0 components with Ns rows and D1 columns, and the first sample feature value matrix, components of the third matrix data include combination in the row direction of the first sample feature value matrix and a matrix of 0 components with N1 rows and D1 columns, and components of the first generated label include combination in the row direction of the first sample label and the first acquired label.

2. The device according to claim 1, wherein the processor is configured to derive the plurality of first sample data from the first other data or the first conversion other data by bootstrap sampling.

3. The device according to claim 1, wherein the first acquired data includes a first feature value matrix with N1 rows and D1 columns, and a first acquired label with N1 rows, the first other data includes a first other feature value matrix with Np rows and D1 columns, and a first other label with Np rows, the Np is an integer of 2 or more, and the N1 is smaller than the Np.

4. The device according to claim 3, wherein one of the plurality of first sample data includes a first sample feature value matrix with Ns rows and D1 columns, and a first sample label with Ns rows, the Ns is smaller than the Np.

5. The device according to claim 3, wherein the first evaluation index corresponds to an average of a distribution of differences between one of the plurality of first regression labels and one of the plurality of first synthetic regression labels.

6. The device according to claim 3, wherein the first evaluation index corresponds to an average of a distribution of a half-width of a histogram of differences between one of the plurality of first regression labels and one of the plurality of first synthetic regression labels.

7. The device according to claim 1, wherein a change of frequency of the first conversion other data with respect to the first feature value matrix is smaller than a change of frequency of the first acquired data with respect to the first feature value matrix.

8. The device according to claim 1, wherein (Ns+N1)/D1 is 250 or more.

9. The device according to claim 1, wherein the processor, in the first synthetic machine learning model derivation operation, is configured to derive one of the plurality of first synthetic regression labels by inputting one of the plurality of first synthetic regression matrix into one of the plurality of first synthetic machine learning models, the one of the plurality of first synthetic regression matrix is with N1 rows and (3×D1) columns, the one of the plurality of first synthetic regression matrix includes first synthetic regression matrix data and second synthetic regression matrix data, and third synthetic regression matrix data, components of the first synthetic regression matrix data include the first feature value matrix, components of the second synthetic regression matrix data include the first feature value matrix, and components of the third synthetic regression matrix data include a matrix of 0 components with N1 rows and D1 columns.

10. The device according to claim 1, further comprising:

a memory, the memory being configured to store at least one of the first acquired data, the first other data or the first evaluation index.

11. The device according to claim 10, wherein the memory is configured to store at least one of the plurality of first regression labels, the plurality of first synthetic regression labels, the plurality of first machine learning models, the plurality of first sample data, the plurality of first synthetic machine learning models or the first conversion other data.

12. The device according to claim 1, wherein the acquisitor is configured to further acquire a second other data, the processor is configured to perform a second evaluation index derivation operation deriving a second evaluation index from a plurality of second regression labels and a plurality of second synthetic regression labels, the plurality of second regression labels are derived from a plurality of second machine learning models, the plurality of second machine learning models are derived from a plurality of second sample data, the plurality of second synthetic regression labels are derived from a plurality of second synthetic machine learning models, the plurality of second synthetic machine learning models are derived from the plurality of second sample data and the first acquired data by a second transfer learning, and the plurality of second sample data are derived from the second other data, or a second conversion other data obtained by converting the second other data.

13. The device according to claim 12, wherein the processor is configured to perform a designation operation designating one of the first other data or the second other data based on a result comparing the first evaluation index and the second evaluation index.

14. The device according to claim 13, wherein the processor is configured to perform regression on another acquired data using the designated one of the first other data and the second other data.

15. The device according to claim 14, wherein the other acquired data is obtained from a first device, and the processor is configured to supply a result obtained by performing the regression on the other acquired data to the first device.

16. The device according to claim 1, wherein the processor is configured to further derive an error index based on the first evaluation index.

17. A data processing system, comprising:

one or a plurality of acquisitors, the one or the plurality of acquisitors being configured to acquire a first acquired data and a first other data; and one or a plurality of processors, the one or the plurality of processors being configured to perform a first evaluation index derivation operation deriving a first evaluation index from a plurality of first regression labels and a plurality of first synthetic regression labels, the plurality of first regression labels being derived from a plurality of first machine learning models, the plurality of first machine learning models being derived from a plurality of first sample data, the plurality of first synthetic regression labels being derived from a plurality of first synthetic machine learning models, the plurality of first synthetic machine learning models being derived from the plurality of first sample data and the first acquired data by a first transfer learning, and the plurality of first sample data being derived from the first other data, or a first conversion other data obtained by converting the first other data, wherein the one or the plurality of processors are configured to perform a first synthetic machine learning model derivation operation deriving the plurality of first synthetic machine learning models, in the first synthetic machine learning model derivation operation, the one or the plurality of processors are configured to generate one of the plurality of first synthetic machine learning models based on a first generated data based on the first acquired data and one of the plurality of first sample data, the first generated data includes a first generated matrix with (Ns+N1) rows and (3×D1) columns and a first generated label with (Ns+N1) rows, where the Ns is an integer of 2 or more, the N1 is an integer of 2 or more, the D1 is an integer of 1 or more, the first generated matrix includes first matrix data, second matrix data, and third matrix data, components of the first matrix data include combination in a row direction of the first feature value matrix and the first sample feature value matrix, components of the second matrix data include combination in the row direction of a matrix of 0 components with Ns rows and D1 columns, and the first sample feature value matrix, components of the third matrix data include combination in the row direction of the first sample feature value matrix and a matrix of 0 components with N1 rows and D1 columns, and components of the first generated label include combination in the row direction of the first sample label and the first acquired label.

18. The data processing system according to claim 17, wherein the first acquired data includes a first feature value matrix with N1 rows and D1 columns, and a first acquired label with N1 rows, the first other data includes a first other feature value matrix with Np rows and D1 columns, and a first other label with Np rows, the Np is an integer of 2 or more, and the N1 is smaller than the Np.

19. The device according to claim 18, wherein one of the plurality of first sample data includes a first sample feature value matrix with Ns rows and D1 columns, and a first sample label with Ns rows, the Ns is smaller than the Np.

20. A data processing method causing a processor to perform a first evaluation index derivation operation, in the first evaluation index derivation operation, the processor is configured to derive a first evaluation index from a plurality of first regression labels and a plurality of first synthetic regression labels, the plurality of first regression labels being derived from a plurality of first machine learning models, the plurality of first machine learning models being derived from a plurality of first sample data, the plurality of first synthetic regression labels being derived from a plurality of first synthetic machine learning models, the plurality of first synthetic machine learning models being derived from the plurality of first sample data and a first acquired data by a first transfer learning, and the plurality of first sample data being derived from a first other data, or a first conversion other data obtained by converting the first other data, wherein the processor is configured to perform a first synthetic machine learning model derivation operation deriving the plurality of first synthetic machine learning models, in the first synthetic machine learning model derivation operation, the processor is configured to generate one of the plurality of first synthetic machine learning models based on a first generated data based on the first acquired data and one of the plurality of first sample data, the first generated data includes a first generated matrix with (Ns+N1) rows and (3×D1) columns and a first generated label with (Ns+N1) rows, where the Ns is an integer of 2 or more, the N1 is an integer of 2 or more, the D1 is an integer of 1 or more, the first generated matrix includes first matrix data, second matrix data, and third matrix data, components of the first matrix data include combination in a row direction of the first feature value matrix and the first sample feature value matrix, components of the second matrix data include combination in the row direction of a matrix of 0 components with Ns rows and D1 columns, and the first sample feature value matrix, components of the third matrix data include combination in the row direction of the first sample feature value matrix and a matrix of 0 components with N1 rows and D1 columns, and components of the first generated label include combination in the row direction of the first sample label and the first acquired label.

* * * * *